United States Patent [19]

Simpson et al.

[11] Patent Number: 4,818,743

[45] Date of Patent: Apr. 4, 1989

[54] DESULFURIZATION CATALYST AND THE CATALYST PREPARED BY A METHOD

[75] Inventors: Howard D. Simpson, Irvine; Ryden L. Richardson, Whittier; Kenneth Baron, Diamond Bar, all of Calif.

[73] Assignee: Union Oil Company of California, Los Angeles, Calif.

[21] Appl. No.: 127,628

[22] Filed: Dec. 1, 1987

Related U.S. Application Data

[60] Continuation of Ser. No. 688,726, Jan. 4, 1985, abandoned, which is a division of Ser. No. 482,920, Apr. 7, 1983, Pat. No. 4,500,424.

[51] Int. Cl.[4] .................... B01J 27/185; B01J 27/188; B01J 27/19
[52] U.S. Cl. ...................................... 502/211; 502/210
[58] Field of Search ................................ 502/210, 211

[56] References Cited

U.S. PATENT DOCUMENTS

| | | | |
|---|---|---|---|
| 3,471,399 | 10/1969 | O'Hara | 208/216 PP |
| 3,755,150 | 8/1973 | Mickelson | 208/216 R |
| 3,755,196 | 8/1973 | Mickelson | 502/211 |
| 3,814,682 | 1/1974 | Christman et al. | 208/216 PP |
| 3,840,472 | 10/1974 | Colgan et al. | 502/211 X |
| 4,003,828 | 1/1977 | Eperly, Jr. | 208/251 H |
| 4,006,076 | 2/1977 | Christensen et al. | 208/211 |
| 4,048,060 | 9/1977 | Riley | 208/210 |
| 4,051,021 | 9/1977 | Hamner | 208/216 PP |
| 4,066,572 | 1/1978 | Choca | 502/210 |
| 4,066,574 | 1/1978 | Tamm | 502/221 X |
| 4,255,282 | 3/1981 | Simpson | 208/216 R X |
| 4,272,409 | 6/1981 | Bergna | 502/65 |
| 4,297,242 | 10/1981 | Hensley, Jr. et al. | 502/220 |
| 4,301,033 | 11/1981 | Takumi et al. | 502/8 |
| 4,326,995 | 4/1982 | Berg et al. | 502/314 |
| 4,376,041 | 3/1983 | Richardson | 208/215 |
| 4,395,329 | 7/1983 | Le Page et al. | 502/211 X |
| 4,456,699 | 6/1984 | Hensley et al. | 502/210 X |
| 4,460,698 | 7/1984 | Hensley et al. | 502/210 X |
| 4,513,097 | 4/1985 | Angmorter et al. | 502/211 |
| 4,520,128 | 5/1985 | Morales et al. | 502/211 X |

Primary Examiner—W. J. Shine
Attorney, Agent, or Firm—Alan H. Thompson; Gregory F. Wirzbicki

[57] ABSTRACT

Hydrocarbon conversion catalysts contain at least one Group VIB metal component, at least one Group VIII metal component, and a phosphorus component on a porous refractory oxide and have a narrow pore size distribution including at least about 75 percent of the total pore volume in pores of diameter from about 70 to about 130 angstroms. The catalyst is useful for promoting a number of hydrocarbon conversion reactions, particularly those involving hydrogenative desulfurization.

47 Claims, No Drawings

DESULFURIZATION CATALYST AND THE CATALYST PREPARED BY A METHOD

This application is a continuation of application Ser. No. 688,726, filed Jan. 4, 1985, now abandoned, which is a division of application Ser. No. 482,920, filed Apr. 7, 1983, now U.S. Pat. No. 4,500,424.

BACKGROUND OF THE INVENTION

1. Field of the Invention

This invention relates to hydrocarbon conversion catalysts such as those utilized to catalyze the reaction of hydrogen with organo-sulfur compounds. More particularly, this invention is directed to catalysts useful for the hydrodesulfurization of hydrocarbons, a method for preparing such catalysts, and most particularly the process for utilizing such catalysts for desulfurizing a hydrocarbon gas oil. The invention is especially directed to catalysts of high overall desulfurization activity and stability.

2. Description of the Prior Art

In the refining of hydrocarbons, it is often necessary to convert a hydrocarbon fraction to different forms. Typically, particulate catalysts are utilized to promote desulfurization or denitrogenation reactions when feedstocks such as vacuum gas oils are contacted with such catalysts under conditions of elevated temperature and pressure and in the presence of hydrogen so that the sulfur components are converted to hydrogen sulfide, and the nitrogen components to ammonia.

Conversions of some hydrocarbons are carried out with a catalyst containing Group VIB and Group VIII metals and phosphorus on a refractory oxide support. Compositions containing these and other elements have been previously investigated. For example, catalysts comprising a Group VIB metal, particularly molybdenum or tungsten, a Group VIII metal, particularly cobalt or nickel, and phosphorus on an alumina base have been disclosed in U.S. Pat. Nos. 3,755,196 and 3,840,472. Such catalysts are very often prepared by impregnation, that is, the deposition of the active components on the support base by contact thereof with an aqueous solution containing the active components in dissolved form. U.S. Pat. No. 3,755,196, for example, describes impregnating media and methods for preparing catalysts using stabilized impregnating solutions containing molybdenum plus nickel or cobalt salts with phosphoric acid dissolved in an aqueous medium. U.S. Pat. No. 3,840,472 discloses another process for preparing a stable impregnating solution that includes dissolving molybdenum oxide with an acid of phosphorus followed by subsequent dissolution of a nickel or cobalt compound.

In addition to active metal components, it has been recognized that hydrocarbon conversion catalysts of specific pore size characteristics have proven effective for catalytic processing. For example, a catalyst employed to remove metals from a metals-containing hydrocarbon residua feedstock ordinarily contains a sizeable number of pores of diameter greater than about 100 angstroms. Such a catalyst often exhibits high demetallation activity, but its useful life is often shortened due to pore plugging as a result of contaminant metal deposition on the surface of the catalyst. Conversely, many catalysts exhibiting a suitable degree of desulfurization activity tend to have a sizeable number of pores having a diameter less than about 100 angstroms. Since it is well known that coke is produced during the conversion of sulfur-containing hydrocarbon molecules to hydrogen sulfide, the useful life of such desulfurization catalysts, at least in part, is shortened by the deposition of coke over the active catalytic sites in the pores of the catalysts.

In the catalytic hydroprocessing of heavy hydrocarbon fractions, such as a residuum, a catalyst employed to promote the removal of sulfur is also known to contact and accumulate contaminant metals. Such a catalyst deactivates by the combination of the two above-mentioned ways, i.e., (1) due to the covering of the active catalytic sites on its surfaces by both coke and metals deposition, and (2) due to pore plugging resulting from contaminant metals deposition. On the other hand, during the hydroprocessing of somewhat lighter, relatively metal-free hydrocarbon fractions, such as gas oils and vacuum gas oils, a catalyst employed to promote the removal of sulfur will not sustain metals deactivation. The useful life of such a catalyst is dependent in large part upon coke deposition.

Although conventional catalysts, including those containing both large and small pores, are somewhat active and stable for hydrocarbon conversion reactions, catalysts of yet higher activities and stabilities are still being sought, and especially those employed for sulfur conversion reactions in hydrocarbon gas oil processing wherein coke deposition on the catalyst is desirably minimized. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur content, become more mild. Milder conditions require less energy to achieve the desired product, and catalyst life is extended due to lower coke formation.

It is generally accepted that greater active component uniformity in the catalytic particles improves activity. The formation of a more evenly distributed layer of the active components, such as the metals and their oxides, or sulfides, in sufficient concentration dispersed throughout the surface area of a catalytic support provides for more efficient utilization of the catalytic surface.

Presently, a need exists for a catalyst, especially for desulfurization of hydrocarbon gas oil, having a suitable pore size distribution that provides for a relatively large percentage of surface area in pore sizes of desired size. A further need exists for a highly active desulfurization catalyst with an extended useful life when employed to promote hydrocarbon conversion reactions, particularly hydrodesulfurization of gas oils.

Accordingly, it is an object of the present invention to provide a hydrocarbon conversion catalyst that is highly active and still has a long useful life when employed in a process to promote the desulfurization of a hydrocarbon oil, particularly with respect to the process for removing sulfur compounds from a gas oil using hydrogen.

It is another object to provide a hydrocarbon conversion catalyst having a relatively evenly distributed layer of active components on a support having a narrow pore size distribution.

A further object of the present invention is to provide a catalyst having a controlled amount of surface area in pores of particular sizes.

It is still another object of the invention to provide a method for producing hydrocarbon conversion catalysts of high desulfurization activity and improved stability in comparison to conventional catalysts of similar composition.

Another object of the invention is to provide a desulfurization catalyst produced by a method that includes the impregnation of a refractory oxide support having a narrow pore size distribution with a stable impregnant solution containing a relatively high concentration of dissolved active components.

These and other objects and advantages of the invention will become apparent from the following description.

SUMMARY OF THE INVENTION

The present invention is directed to a catalyst, its method of preparation, and a process employing such a catalyst for the conversion of hydrocarbons. Catalysts of the invention are useful for promoting hydrodesulfurization, and more particularly for hydrodesulfurization of hydrocarbon gas oils. In one embodiment, a catalyst composition comprising a Group VIB metal component, a Group VIII metal component, and a phosphorus component on a porous refractory oxide support particle is employed to convert organo-sulfur hydrocarbon components to hydrogen sulfide. Catalysts prepared in accordance with the present invention have a narrow pore size distribution including at least about 75 percent of the total pore volume in pores of diameter from about 70 to about 130 angstroms and exhibit high activity and stability when utilized to promote high conversions of organo-sulfur compounds to hydrogen sulfide.

DETAILED DESCRIPTION OF THE INVENTION

The invention is directed to a hydrocarbon conversion catalyst comprising active metals on a support, and more preferably, to hydrodesulfurization catalysts comprising Group VIII and Group VIB active metal components and phosphorus components on a support comprising a porous refractory oxide material. The catalyst of the invention is particularly well suited for hydrodesulfurization wherein the desired result is desulfurization of a hydrocarbon oil containing a low content of metallic contaminants.

Porous refractory oxides useful in the present hydroprocessing catalysts include silica, magnesia, silica-magnesia, zirconia, silica-zirconia, titania, silica-titania, etc. Mixtures of the foregoing oxides are also contemplated, especially when prepared as homogeneously as possible. The preferred refractory oxide material, however, comprises alumina and, optionally, silica-alumina. When employed in the preparation of catalysts promoting hydrocarbon conversion processes, such as hydrodesulfurization, transition aluminas such as gamma alumina, delta alumina and theta alumina are highly preferred refractory oxides. It is most highly preferred that the porous refractory oxide contain at least about 90, and even more preferably at least about 95 weight percent of gamma alumina.

The support material is usually prepared in the form of shaped particulates by methods well known in the art, with the preferred method being to extrude a precursor of the desired support, as for example, an inorganic refractory oxide gel such as a peptized alumina gel prepared from comulled spray-dried powders, through a die having openings therein of desired size and shape, after which the extrudate is cut into desired length and dried, usually at temperatures from about 100° F. to about 250° F. The particles usually have a symmetrical cross-sectional shape, and the average length of the particles is at least about twice that of the cross-sectional diameter. The cross-sectional diameter is herein considered as the longest dimension on the cross-section taken perpendicular to the longest axis of symmetry of the particle. Preferred refractory oxide particles have cross-sectional shapes that are cylindrical or have protrusions (lobes) from a central area, such as polylobes. The cross-sectional diameter of the particles is usually about 1/40 to about ¼ inch, preferably about 1/32 to about 1/12 inch, and most preferably about 1/24 to about 1/15 inch. Among the preferred refractory oxide particles, at least for hydroprocessing, are those having cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.04 inch. Another preferred particulate has a tetralobal cross-sectional shape, as for example, when the lobes comprise arcs of circles of equal diameter having their centers at the vertices of a rhombus whose diagonals intersect at or near the center of the cross-section.

Support particles prepared by the foregoing or equivalent procedures are generally precalcined, especially if gamma alumina is the chosen support material. Temperatures above about 900° F. are usually required to convert alumina gel or hydrated alumina particulates to gamma alumina. Typically, temperatures between about 1,000° F. and 1,500° F. are utilized to effect this transformation, with holding periods of ¼ to 3 hours generally being effective.

Physical characteristics of the support particles utilized to prepare the catalyst of the invention include an unusually narrow pore size distribution wherein at least about 70 percent, and preferably at least aout 75 percent of the total pore volume is in pores of diameter distributed over a narrow range of about 40 angstroms within the 80 angstrom range of about 50 to about 130 angstroms, as determined by conventional mercury porosimeter testing methods. Oftentimes, the support particles have a pore size distribution including at least 70, and preferably 75 percent of the total pore volume in pores of diameter from about 70 to about 130.

Since the finished catalysts of the invention require at least 75 percent of their pore volume to be in pores of 70 to 130 angstrom diameter, it will be seen from the foregoing that, in the preparation of such catalysts, the support particles may initially have a similar distribution of pore volume as the final catalyst, but such is not necessary. As will be shown hereinafter in Example I, the support particles may have, for example, at least 60 percent, preferably at least 70 percent, and most preferably at least 75 percent of their pore volume in pores of 60 to 100 angstrom diameter and yet still, due to the subsequent impregnations, calcinations, and other catalyst preparational steps hereinafter discussed, yield a final catalyst having, as required herein, at least 75 percent, and preferably at least 80 percent, and most preferably at least 85 percent of the total pore volume in pores of 70 to 130 angstrom diameter. In a highly preferred embodiment, the support has at least about 70 percent of the total pore volume in pores of diameter from about 60 to about 90 angstroms.

Other preferred characteristics of supports utilized herein include a total pore volume, a mode pore diameter and surface area large enough to provide substantial space and area to deposit the active metal components during preparation of the catalyst as well as to accumulate contaminants such as coke during catalyst use. The total pore volume of the support, as measured by the conventional mercury/helium differential density method, is usually about 0.30 to about 1.0 cc/gram, preferably about 0.35 to about 0.80 cc/gram, and most preferably about 0.40 to about 0.70 cc/gram. The mode pore diameter of the support is usually greater than about 60 angstroms, usually in the range from about 60 to about 90 angstroms, and preferably from about 70 to about 90 angstroms. As used herein, the term "mode pore diameter" is that pore diameter above which 50 percent of the total pore volume is contained and below which 50 percent of the total pore volume is contained. Additionally, the surface area (as measured by the B.E.T. method) of the support particles is above about 100 m$^2$/gram, usually from about 100 m$^2$/gram to about 400 m$^2$/gram, and preferably about 125 m$^2$/gram to about 350 m$^2$/gram.

As a further illustration of the narrowness of the pore size distribution of the preferred support, at least about 40 percent of the total pore volume is in pores of diameter between the mode pore diameter and less than 40 angstroms, more preferably less than 30 angstroms, and most preferably less than 20 angstroms above the mode pore diameter. Furthermore, less than about 0.05 cc/gram and preferably less than 0.04 cc/gram of the total pore volume, i.e. less than 10 percent of the total pore volume, is in pores of diameter greater than 130 angstroms, while small pores, i.e., pores having less than about a 60 angstrom diameter, comprise less than about 0.045 cc/gram of the total pore volume, usually less than about 7 percent of the total pore volume. In the most highly preferred embodiment of the support, less than about 15 percent of the total pore volume is pores of diameter greater than 100 angstroms, and less than about 10 percent of the total pore volume is in pores of diameter greater than 110 angstroms.

Preferred support particles of the invention have at least about 85 percent, preferably at least about 90 percent, and most preferably at least about 95 percent of the total surface in pores of diameter from about 50 to about 110 angstroms. the pore size distribution of the support is narrow, a preferred support also contains a significant number of pores of diameter in each 10 angstrom interval range starting at 50 and concluding at 110 angstroms, (i.e. 50–60, 60–70, 70–80, 80–90, 90–100 and 100–110) so that each such interval range comprises at least about 5 percent of the total surface area of the support. In a highly preferred embodiment, the pores having diameters in each 10 angstrom interval range from 60 to 90 (i.e. 60–70, 70–80, and 80–90) comprise at least about 20 percent of the total surface area.

To prepare the hydrocarbon conversion catalyst, the support material is compounded, as by impregnation of calcined support particles, with one or more components or precursors of the catalytically active Group VIB and VIII metals and phosphorus. The catalyst is typically prepared with impregnating solutions containing phosphorus components, preferably an acid of phosphorus such as phosphoric acid. The solutions usually contain a dissolved acid of phosphorus and Group VIB and VIII metal components in aqueous media, with the preferred Group VIB metals being molybdenum and tungsten, and the preferred Group VIII metals being cobalt and nickel. Cobalt and molybdenum are the most preferred Group VIII and VIB metals, respectively. The solutions contain Group VIII metal components, especially cobalt or nickel, usually in a total concentration from about 1 to about 10 weight percent, calculated as the monoxide. The mole ratio of the phosphoric acid (as P) to the Group VIB metal components (as the trioxide) in the solution is usually greater than about 0.1, and preferably at least about 0.2. Preferably, the solution contains one or more Group VIB metal components in a total concentration of at least 17 weight percent, calculated as the metal trioxides, and more preferably from about 17 to about 35 weight percent.

The impregnant solution may be most conveniently prepared by dissolving into water a Group VIB metal compound and phosphoric acid such that the resulting solution has a pH preferably less than about 1.2, more preferably less than about 1.0, and most preferably from about 0 to about 1.0. Generally, either the phosphoric acid or Group VIB metal compound is first dissolved in the aqueous medium under conditions which will effect dissolution and provide the specified concentrations of components. At atmospheric pressure, any temperature in the range of about 35° F. to about 210° F. may be employed, but it is generally preferred to use a temperature of about 75° F. to about 150° F. It is preferred that the phosphoric acid be added to the solution after dissolution of at least a portion of the Group VIB metal component, especially when an impregnating solution is desired that contains a relative large proportion of Group VIB metal components, typically in a total concentration greater than about 10 weight percent, and preferably greater than about 17 weight percent. In addition to lowering the pH of an aqueous solution, the presence of phosphoric acid in the impregnating solution reduces the length of time required to dissolve a given amount of Group VIB metal component and, more importantly, increases the total amount of Group VIB metal components which be dissolved therein. For example, under the same temperature and pressure conditions effecting dissolution, an impregnaing solution containing a maximum total concentration of about 10 weight percent of Group VIB metal components and no phosphoric acid requires more time to dissolve and is less stable than a solution containing phosphoric acid and having a maximum total concentration from about 10 to about 35 weight percent of Group VIB metal components.

Phosphoric acid is conveniently used to increase the stability of the impregnating solution, typically when added in such an amount that the mole ratio to the Group VIB metal component is greater than about 0.1. Stability of the impregnating solution is generally increased as the mole ratio is increased; however, extremely high mole ratios, such as those greater than about 1.0 are economically limited and therefore usually avoided. A stable impregnating solution is essentially free of precipitating components and the dissolved components remain in solution for a time period sufficient to impregnate catalyst support particles without the formation of crystalline deposits. Furthermore, the stable impregnating solutions may be stored for a long term, such as a day to a week or more, prior to effective impregnation of support particles.

Phosphoric acid may be added to the solution in liquid or solid form. A preferred compound is orthophosphoric ($H_3PO_4$) acid in a highly concentrated aqueous solution, although any suitable form of phosphoric acid or precursor thereof may be utilized.

A variety of Group VIB metal components, or precursors thereof, may be utilized to produce a stable impregnating solution. In general, all Group VIB metal compounds soluble in aqueous media, particularly those of molybdenum or tungsten, may be utilized. The oxides of molybdenum, most preferably molybdenum trioxide, are particularly useful, especially when dissolved in phosphoric acid. Others particularly useful are salts containing both a Group VIB metal and ammonium ion, such as ammonium dimolybdate, and most preferably ammonium heptamolybdate. Impregnating solutions containing ammonium ions are highly preferred, especially when the ammonium ion is present in a concentration exceeding 1.5 moles per liter, and preferably exceeding 1.9 moles per liter.

A Group VIII metal component, usually in compound form, may be added to the impregnating solution either before or after dissolution of the Group VIB metal and phosphoric acid. However, it is preferred to add the Group VIII metal compound after dissolution of the Group VIB metal. Suitable Group VIII metal compounds are water-soluble, and preferably include a nitrate or carbonate of cobalt or nickel, or combinations thereof. The carbonate or nitrate of cobalt and nickel are preferred. Cobalt nitrate is highly preferred, especially when dissolved with ammonium heptamolybdate as taught, for example, in U.S. patent application Ser. No. 287,022 filed July 27, 1981, herein incorporated by reference in its entirety. Cobalt carbonate or cobalt oxide are most highly preferred when dissolved with molybdenum trioxide as taught, for example, in U.S. Pat. No. 3,840,472. Preferably, the final solution contains Group VIII components (as the monoxide) in a total concentration between about 1 and 10 weight percent and more preferably less than 6 weight percent.

One unusual feature of the invention is that the impregnating solution is stable even when containing a relatively large proportion of Group VIB metal components, and more particularly molybdenum components, i.e., in a total concentration greater than about 17 weight percent. When the pH of the impregnating solution is below about 1.2, essentially no crystalline deposits or crystalline aggregations are detected in the impregnating solution that result in a lessening in hydrocarbon conversion activity and stability in the final catalyst.

Several conventional methods may be employed to impregnate the catalyst support particles with the impregnant solution, as for example, by spray impregnation, wherein a solution containing the metal components or precursors in dissolved form is sprayed onto the support particles. Another method is the circulation or multi-dip procedure wherein the support material is repeatedly contacted with the impregnant solution with or without intermittent drying. Yet another method involves soaking the support in a relatively large volume of the impregnant solution, and yet one more method, the preferred method, is the pore volume or pore saturation technique wherein support particles are introduced into an impregnant solution of volume just sufficient to fill the pores of the support. On occasion, the pore saturation technique may be modified so as to utilize an impregnant solution having a volume between 10 percent less and 10 percent more than that which will just fill the pores.

Control of the contact time (aging) of the support particles with the impregnating solution improves homogeneity of the active components on the support. It is preferred to age the impregnated particles in the impregnation solution for at least about twenty minutes but usually less than about two hours before drying and calcining. However, the particles may be aged for up to eight hours or longer, especially when the solution contains a relatively high concentration of Group VIB metal components, typically, greater than 17 weight percent. Substantially even distribution of active components in the support results from aging the support particles under mild conditions, i.e., 50° F. to about 100° F., while impregnating by the pore saturation method.

If the active metal and phosphorus components or precursors are incorporated by impregnation, a subsequent or second calcination, as for example, at temperatures between 900° F. and 1,400° F., converts the metals to their respective oxide forms. In some cases, subsequent calcinations may follow the impregnation of individual active metals. Subsequent calcinations, however, may be avoided in alternative embodiments of the invention, as for example, by comulling the active metals with the support material rather than impregnating the metals thereon. In comulling, the precursor of the support material, usually in a hydrated or gel form, is admixed with precursors of the active metal and phosphorus components, either in solid form or in solution, to produce a paste suitable for shaping by known methods, e.g., pelleting, extrusion, etc. A subsequent calcination yields a hydrocarbon conversion catalyst containing the active metals and phosphorus in their respective oxide forms.

The final composition of the catalyst of the invention contains a Group VIB metal component, a Group VIII metal component and a phosphorus component on a porous refractory oxide support. The final composition generally contains at least about 3 and preferably between about 17 and about 35 weight percent Group VIB metal components, calculated as the trioxides, from about 0.5 to about 10 and preferably about 1 to about 6 weight percent Group VIII metal components, calculated as the monoxide, and about 0.5 to about 10, preferably about 1 to about 6 weight percent of phosphorus components, calculated as P. It is more preferred when the catalyst is utilized to promote a desulfurization reaction during the processing of a hydrocarbon gas oil that the final composition contain greater than 10 weight percent, and more preferably between about 17 and about 35 weight percent of Group VIB metal components, calculated as the trioxide, preferably less than about 6 weight percent, and more preferably between about 1 and 4 weight percent of Group VIII metal components, calculated as the monoxide, and preferably less than 6 weight percent, and most preferably about 1 to about 6 weight percent of phosphorus components, calculated as P. In still another preferred embodiment, the final composition contains about 17 to about 25 weight percent of molybdenum components, calculated as $MoO_3$, about 1 to about 4 weight percent of cobalt or nickel components, calculated as the monoxide, and about 1 to about 4 weight percent of phosphorus components, calculated as P.

Although many conventional catalysts and/or their preparations require some form of silicon in the support particles, the presence of silicon in the final catalyst of this invention is optional, and usually not preferred, especially when the catalyst is employed to promote desulfurization reactions in hydrocarbon gas oils. It is believed that interaction between phosphoric acid and silicon-containing components in refractory oxide supports results in adverse activity and/or stability effects for desulfurization catalysts prepared with such supports, and phosphoric acid in sufficient concentration may even cause support degradation with respect to silica. However, silicon may be incorporated into the final catalyst composition so as to improve the activity and/or stability of the catalyst of the invention for promoting a different hydrocarbon conversion reaction, such as denitrogenation.

Another feature of the preferred embodiment of the invention is that, after calcination of the impregnated support particles, no crystalline deposits or crystalline aggregations resulting in a lessening in activity or stability of the final catalyst are detected. As illustrated by examples hereinafter set forth, a catalyst prepared with an impregnant solution and support particles of the invention is highly stable and active for promoting hydrocarbon conversion reactions. The impregnant solution and the refractory oxide support with its narrow pore size distribution are combined during preparation to produce a hydrocarbon conversion catalyst exhibiting unexpectedly superior stability when promoting conversion reactions that produce various types of coke deposits. Better dispersed forms of active components from the impregnating solution onto the support particles are also believed responsible in part for the improved activity and stability of the catalyst of the invention as compared to conventional catalysts. Impregnation of support particles of the invention with an impregnant solution reduces the segregation of catalytic components into inactive crystalline species on the support.

The physical characteristics of the final catalyst composition will usually vary from those of the support particles by less than about 25 percent. In accordance with the invention, a hydrocarbon conversion catalyst is prepared so as to have a narrow pore size distribution wherein at least about 75 percent, preferably at least about 80 percent, and most preferably at least about 85 percent of the total pore volume is in pores of diameter from about 70 to about 130 angstroms. Ordinarily the catalyst has less than about 10 percent of the total pore volume in pores of diameter below about 70 angstroms and preferably less than about 0.05 cc/gram. Also, the catalyst has less than about 10 percent of the pore volume in pores of diameter greater than about 130 angstroms, preferably less than about 0.05 cc/gram.

Another porosity feature of the catalyst is the narrow pore size distribution of the pores of diameter greater than the mode pore diameter. The mode pore diameter of the catalyst of the invention is usually about 75 to about 115 angstroms, preferably 80 to about 110 angstroms, and most preferably about 85 to about 100 angstroms. Ordinarily, at least about 40 percent of the total pore volume is in pores of diameter between the mode pore diameter and less than about 90 angstrom, preferably less than about 50 angstroms, and most preferably less than about 25 angstroms above the mode pore diameter. With respect to small pores, at least about 40 percent of the total pore volume is in pores of diameter between the mode pore diameter and less than about 50, and preferably less than about 25 angstroms below the mode pore diameter.

Generally, the supports and catalysts of the invention have steeper-sloped pore size distribution curves than the curves of conventional catalysts. As used herein, a steeper slope is a negative slope of greater absolute value than the absolute value of the negative slope of a comparative support or catalyst. The slope, as defined herein, of a pore size distribution curve, derived for example from mercury porosimeter testing techniques, [plotting cummulative pore volume (ordinate) vs. pore diameter (logarithmic scale abscissa)], is for a line drawn through a point on the curve representing 40 percent of the total pore volume in pores of diameter above the mode pore diameter and through a point on the curve representing 40 percent of the total pore volume in pores of diameter below the mode pore diameter. More preferably, the support and catalyst of the invention have steeper slopes than respective conventional supports and catalysts for a line drawn through a point on the curve representing the mode pore diameter and through a point on the curve representing 40 percent of the total pore volume in pores of diameter greater than the mode pore diameter.

Other physical properties of the final catalyst composition typically include a total pore volume of about 0.25 to about 1.0 cc/gram, and preferably about 0.30 to about 0.60 cc/gram and a surface area greater than about 100 $m^2$/gram, and preferably between about 100 and 250 $m^2$/gram with both properties determined by the conventional methods previously disclosed herein. The typical catalyst has at least about 75 percent, preferably at least about 80 percent, and most preferably at least about 85 percent of its surface area in pores of diameter from about 70 to about 130 angstroms. More particularly, the typical catalyst contains a significant number of pores of diameter in each 10 angstrom interval range starting at 70 and concluding at 130 angstroms, (i.e. 70–80, 80–90, 90–100, 100–110, 110–120 and 120–130) so that each such interval range comprises a minimum of about 8 percent, preferably at least about 10 percent, and most preferably at least about 12 percent of the total surface area of the catalyst. For example, a catalyst of the invention having a total surface area of about 140 to about 180 $m^2$/gram has a mimimum of about 10 $m^2$/gram, preferably at least about 15 $m^2$/gram and most preferably at least about 20 $m^2$/gram of surface area due to pores of diameter in each of the previously mentioned 10 angstrom interval ranges from 70 to 130 angstroms.

A highly preferred catalyst of the invention contains about 1 to about 6 weight percent of Group VIII metal components, calculated as the monoxide, from about 17 to about 35 weight percent of Group VIB metal components, calculated as the trioxide, and about 1 to about 6 weight percent of phosphorus components, calculated as P, on a porous refractory oxide support consisting essentially of gamma alumina. The most preferred Group VIII and Group VIB metals in this embodiment are cobalt and molybdenum, respectively. Physical characteristics of this catalyst include a total pore volume of about 0.30 to about 0.50 cc/gram, a surface area from about 125 to about 225 $m^2$/gram and a mode pore diameter from about 80 to about 110 angstroms.

Catalysts prepared in accordance with the invention are employed under hydroprocessing conditions suited for their intended purposes, as for example, in a process for promoting the removal of sulfur from a hydrocarbon oil. Generally, the catalyst of the invention is employed in a hydrocarbon conversion reaction at the usual conditions including an elevated temperature generally above 600° F., a pressure generally above 500 p.s.i.g., and the presence of hydrogen. Typically, the catalyst is more active, sometimes far more active, in a sulfided form than in an oxide form in which they are generally prepared. Accordingly, after calcination, the catalyst of the invention may be sulfided prior to use (in which case the procedure is termed "presulfiding") by passing a sulfiding gas over the catalyst prepared in the calcined form. Temperatures between 200° F. and 1,200° F. and space velocities between about 150 and 500 v/v/hr are generally employed and this treatment is usually continued for about two hours. Ordinarily, a mixture of hydrogen and one or more components selected from the group consisting of sulfur vapor and the sulfur compounds (e.g., lower molecular weight thiols, organic sulfides, and especially $H_2S$) is suitable for presulfiding the catalyst. Generally speaking, the relative proportion of hydrogen in the presulfiding mixture is not critical, with any proportion of hydrogen ranging from 1 to 99 percent by volume being adequate.

If the catalyst is to be used in a sulfide form, it is preferred that a presulfiding procedure be employed. However, since the hydrocarbon conversion catalyst of the invention is used to upgrade sulfur-containing hydrocarbons, as in hydrode-sulfurization, one may as an alternative, accomplish the sulfiding in situ, particularly with hydrocarbon oils containing at least about 0.2 weight percent or more of sulfur under conditions of elevated temperature and pressure. The hydrocarbon oils typically contain sulfur in the form of organosulfur compounds, for example, mercaptans, thiophenes, disulfides, and the like, and are usually present in a total concentration greater than 5 ppmw, but more often in excess of 100 ppmw, and often in a concentration greater than 0.1 weight percent, calculated as S. Additionally, feedstocks containing undesirable proportions of nitrogen, usually in a concentration greater than 0.1 weight percent, and typically in the range from about 0.2 and 0.4 weight percent, may be processed while utilizing the catalyst of the invention for desulfurization.

Generally, a substantial proportion of the hydrocarbon oil (i.e., at least about 90 weight percent) processed by employing the catalyst of the invention will boil at a temperature less than about 1,050° F., and preferably less than about 1,000° F., and usually in the range from about 100° F. to about 1,050° F. The most preferred hydrocarbon oils processed with the catalyst of the invention are gas oils and vacuum gas oils usually boiling in the range between about 600° F. and 1,050° F., with a substantial proportion, i.e. at least about 90 percent, boiling at a temperature less than about 1050° F. Moreover, the hydrocarbon oil usually contains contaminant metals, such as nickel, vanadium and iron, in a total concentration less than about 100 ppmw, preferably less than .5 ppmw, and most preferably are essentially metal free. Also, the hydrocarbon oil typically contains asphaltenes in a concentration of less than about 10 weight percent, and preferably less than about 5 weight percent of the oil. It is most highly preferred that the hydrocarbon oil be essentially asphaltene free.

A hydrocarbon conversion catalyst of desired chemical and physical characteristics, as prepared in accordance with the invention, is usually employed as either a fixed or fluidized bed of particulates in a suitable reactor vessel wherein the hydrocarbon oil to be treated is introduced and subjected to elevated conditions of pressure and temperature, and a substantial hydrogen partial pressure, so as to effect the desired degree of conversion of, for example, sulfur compounds to hydrogen sulfide. Most usually, the catalyst is maintained as a fixed bed with the hydrocarbon oil passing downward therethrough, and the reactor is generally operated under conditions selected from those shown in the following TABLE I:

TABLE I

| Operating Conditions | Suitable Range | Preferred Range |
|---|---|---|
| Temperature, °F. | 500–900 | 600–850 |
| Hydrogen Pressure, p.s.i.g. | 100–3,000 | 500–1,500 |
| Space Velocity, LHSV | 0.05–5.0 | 0.1–3.0 |
| Hydrogen Recycle Rate, scf/bbl | 500–15,000 | 1,000–5,000 |

The catalyst of the invention exhibits high activity for an extremely long period of time. The catalyst may be utilized to effect substantially complete desulfurization or at least a significant degree of desulfurization in a single pass of the hydrocarbon oil with the catalyst. As demonstrated in the examples hereinafter, over 90 percent removal of sulfur may be accomplished in a single pass, with the catalyst remaining highly stable, deactivating at a rate less than 0.5° F. per day.

The invention is further illustrated by the following examples which are illustrative of specific modes of practicing the invention and are not intended as limiting the scope of the invention as defined in the appended claims.

EXAMPLE 1

The catalyst prepared in accordance with the invention is tested under typical hydrodesulfurization conditions against a reference catalyst consisting of particles of a commercially available catalyst. The commercial catalyst, having a 1/20 inch trilobal cross-sectional shape, has a pore size distribution as shown in Table II and a nominal composition of 15.0 weight percent of molybdenum components, calculated as $MoO_3$, 5.0 weight percent of cobalt components, calculated as CoO, 1.0 weight percent of phosphorus, calculated as P, and the balance of gamma alumina.

The catalyst of the invention compared against the commercial catalyst is prepared as follows: 270 ml of 85 percent phosphoric acid ($H_3PO_4$) is slowly stirred into 1,240 ml of water in a three liter beaker, the resulting solution is brought to a boil, and 750 grams of molybdenum trioxide ($MoO_3$) is stirred vigorously into the boiling solution. Then 250 grams of cobalt carbonate ($CoCO_3$) is added, with liberation of carbon dioxide ($CO_2$) during dissolution. A clear red solution is obtained after heating and mixing for six hours. After dissolution of the cobalt carbonate, an impregnant solution having a volume of 2,000 mls. is obtained. This solution is similar to a solution utilized in making a catalyst taught in U.S. Pat. 3,840,472.

Gamma alumina support particles (100 grams), having a 1/20 inch trilobal cross-sectional shape and a pore size distribution as shown in TABLE II, are then contacted with 70 ml of the impregnant solution. The impregnated composition is allowed to stand (age) for two hours following which it is oven dried at 110° C. and then calcined at 1,100° F. for ½ hour in flowing air. The final catalyst has a pore size distribution as shown in TABLE II and a nominal composition containing 20.5 weight percent of molybdenum components, calculated as $MoO_3$, 3.3 weight percent of cobalt components, calculated as CoO, 2.8 weight percent of phosphorus components, calculated as P, and the balance comprising alumina. The slope, as defined hereinbefore, of a pore size distribution curve derived from Table II for the catalyst of the invention is steeper, i.e. has a negative slope of greater absolute value, than that of the commercial catalyst.

single-pass system with once-through hydrogen such that the effluent sulfur concentration is maintained at 0.15 weight percent sulfur, equivalent to about 94 percent desulfurization.

Giving the reference commercial catalyst an arbitrary activity of 100, relative activities of the catalyst of the invention compared to the reference commercial catalyst are determined by calculation and tabulated in

TABLE II

PORE SIZE DISTRIBUTIONS AND SURFACE AREAS

| Pore Diameter, Angstroms | Support | | | | Catalyst | | | | Commercial Catalyst | | | |
|---|---|---|---|---|---|---|---|---|---|---|---|---|
| | Pore Volume, cc/gram | % of total p.v. | Surface Area, m²/gram | Cum. S.A. | Pore Volume, cc/gram | % of total p.v. | Surface Area, m²/gram | Cum. S.A. | Pore Volume, cc/gram | % of total p.v. | Surface Area, m²/gram | Cum. S.A. |
| 50– | 0.005 | 0.8 | 6 | 303 | 0 | 0 | 2 | 159 | 0.005 | 1.0 | 5 | 212 |
| 50–60 | 0.035 | 5.7 | 24 | 297 | 0.005 | 1.3 | 4 | 157 | 0.02 | 4.2 | 14 | 207 |
| 60–70 | 0.100 | 16.4 | 64 | 273 | 0.020 | 5.1 | 10 | 153 | 0.050 | 10.5 | 33 | 193 |
| 70–80 | 0.170 | 29.9 | 86 | 209 | 0.040 | 10.1 | 21 | 143 | 0.100 | 21.1 | 52 | 160 |
| 80–90 | 0.150 | 24.6 | 73 | 123 | 0.060 | 15.2 | 23 | 122 | 0.100 | 21.1 | 48 | 108 |
| 90–100 | 0.060 | 9.8 | 23 | 50 | 0.070 | 17.7 | 37 | 99 | 0.070 | 14.7 | 33 | 60 |
| 100–110 | 0.040 | 6.6 | 18 | 27 | 0.050 | 12.7 | 19 | 62 | 0.030 | 6.3 | 14 | 27 |
| 110–120 | 0.010 | 1.6 | 3 | 9 | 0.050 | 12.7 | 19 | 43 | 0.035 | 7.4 | 4 | 13 |
| 120–130 | 0.005 | 0.8 | 2 | 6 | 0.065 | 16.5 | 17 | 24 | 0.007 | 1.5 | 2 | 9 |
| 130–200 | 0.010 | 1.6 | 3 | 4 | 0.015 | 3.8 | 12 | 7 | 0.013 | 2.7 | 1 | 7 |
| 200–4000 | 0.020 | 3.3 | 1 | 1 | 0.020 | 5.1 | 4 | 5 | 0.035 | 7.4 | 1 | 5 |
| 4000+ | 0.005 | 0.8 | 0–1 | 0 | 0 | 0 | 1 | 0 | 0.010 | 2.1 | 0 | 4 |
| Total | 0.61 | 99.9 | 303 | | 0.395 | 100 | 159 | | 0.475 | 100 | 212 | |

The catalyst of the invention and the reference catalyst are then each presulfided by contact with Kuwait vacuum gas oil (VGO) "spiked" with dimethyl sulfide to a 2.9 weight percent sulfur content in the presence of hydrogen flowing at 2,000 standard cubic feet per barrel (scf/b). After heating the reactor containing the catalysts to 250° F., the spiked vacuum gas oil was introduced at a liquid hourly space velocity (LHSV) of 2.5. The temperature is gradually increased hourly by 50° F. until 600° F. is reached, except the temperature is held at 400° F. for ten hours and at 600° F. for two hours. The feedstock is then switched to Light Arabian VGO, the properties of which are shown in TABLE III, fed at a rate 2.5 LHSV. The temperature is increased hourly by 20° F. to a temperature of 730° F.

TABLE III

FEEDSTOCK PROPERTIES

| Feed Description | Light Arabian VGO |
|---|---|
| Gravity, °API | 20.8 |
| Sulfur, X-ray, Wt. % | 2.54 |
| Nitrogen, Wt. % | 0.090 |
| Pour Point, °F. | +95 |
| Carbon Residue on 10% Botts, D-189, Wt. % | 0.42 |
| ASTM D-1160 Distillation, °F. | |
| IBP/5 Vol. % | 623/700 |
| 10/20 | 737/776 |
| 30/40 | 810/837 |
| 50/60 | 860/898 |
| 70/80 | 928/968 |
| 90/95 | 1,019/1,056 |
| BP/Rec., Vol. % | 1103/99.0 |

The catalyst of the invention is then tested to determine its activity and temperature increase requirement (TIR), i.e., stability for hydrodesulfurization in comparison to the reference commerical catalyst. The catalyst is charged to a reactor and utilized at 730° F. to hydrodesulfurize a Light Arabian VGO feedstock having the characteristics shown in TABLE III under the following conditions: 640 psig total pressure, 2.5 LHSV, and hydrogen rate of 1,500 SCF/B. The feedstock is contacted with the described catalysts in a single-stage, TABLE IV. These determinations are based on a comparison of the reaction rates for desulfurization obtained from the data of the experiment according to the following standard equation which assumes one and one-half order kinetics for desulfurization:

$$\text{Relative Desulfurization Activity} = \frac{(1/S_p)^{\frac{1}{2}} - (1/S_f)^{\frac{1}{2}}}{(1/S_{pr})^{\frac{1}{2}} - (1/S_{fr})^{\frac{1}{2}}} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

The temperature increase requirement (TIR) determinations are based upon calculation by a relatively simple formula. TIR may be determined by dividing the difference between two operating temperatures required to give a specific product on two given days in a run by run length interval between these days.

TABLE IV

| | Composition | | | Hydrodesulfurization | |
|---|---|---|---|---|---|
| | MoO₃ Wt. % | CoO Wt. % | P Wt. % | Activity | Stability TIR °F./day |
| Com'l. Ref. | 15.0 | 5.0 | 1.0 | 100 | 0.58 |
| Catalyst | 20.0 | 5.0 | 3.0 | 103 | 0.33 |

The data summarized in TABLE IV indicate that the temperature increase requirement (TIR) calculated in °F./day is substantially lower for the catalyst of the invention as compared to the reference catalyst. The deactivation rate of the reference catalyst is more than about 1.5 times greater than is the case with the catalyst of the invention. In addition to this superiority in stability, the catalyst of the invention also exhibits improved activity compared to the reference catalyst.

While particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A catalyst prepared by the method comprising the steps of (1) impregnating support particles with an aqueous impregnant solution comprising a dissolved Group VIB metal component, a dissolved Group VIII metal component and a dissolved phosphorus component, said aqueous impregnant solution containing about 1 to about 6 weight percent of said phosphurs component, calculated as P, said supported comprising a narrow pore size distribution including at least about 60 percent of the total pore volume in pores of diameter from about 60 to about 100 angstroms, having a mode pore diameter in the range from about 60 to about 90 angstroms and at least about 40 percent of the total pore volume in pores of diameter between the mode pore diameter and less than about 40 angstroms above the mode pore diameter and (2) calcining the impregnated support particles to produce a catalyst having a narrow pore size distribution including at least about 75 percent of the total pore volume in pores of diameter from about 70 to about 130 angstoms and less than 10 percent of the total pore volume in pores of diameter greater than 130 diameter angstroms, having a mode pore diameter in the range from about 75 to about 110 angstroms and at least about 40 percent of the total pore volume in pores of diameter between the mode pore diameter and less than about 90 angstroms above the mode pore diameter.

2. The catalyst defined in claim 1 wherein said impregnant solution comprises at least about 17 weight percent of a molybdenum component, calculated as $MoO_3$.

3. The catalyst defined in claim 1 wherein said impregnant solution consists essentially of at least about 17 weight percent of a molbdenum component, calculated as $MoO_3$, and about 1 to about 6 weight percent of a nickel or cobalt component, calculated as the monoxide.

4. The catalyst defined in claim 6 wherein said impregant solution contains dissolved molybdenum trioxide and nickel or cobalt carbonate in an aqueous solution containing phosphoric acid.

5. The catalyst defined in claim 1 wherein said impregnant solution contains dissolved ammonium heptamolybdate and nickel or cobalt nitrate in an aqueous solution of phosphoric acid.

6. The catalyst defined in claim 1 further comprising a total pore volume about 0.30 and 0.50 cc/gram and a total surface area between about 100 and 250 m²/gram.

7. A catalyst containing at least one Group VIB metal component, at least one Group VIII metal component and about 1 to about 6 weight percent of a phosphorus component, calculated as P, and prepared with a porous refractory oxide support, said support comprising a narrow pore size distribution including at least about 60 percent of the total pore volume in pores of diameter from about 60 to about 100 angstroms, having a mode pore diameter in the range from about 60 to about 90 angstroms and at least about 40 percent of the total pore volume in pores of diameter between the mode pore diameter and less than about 40 angstroms above the mode pore diameter.

8. The catalyst defined in claim 7 wherein said support has a total pore volume from about 0.35 to about 0.8 cc/gram.

9. The catalyst defined in claim 7 wherein said support has at least 75 percent of said total pore volume being in pores of diameter from about 60 to about 100 angstroms.

10. The catalyst defined in claim 7 wherein said support has at least 50 percent of said total pore volume in pores of diameter from about 70 to about 90 angstroms.

11. The catalyst defined in claim 7 further comprising at least about 85 percent of the total surface area of said support in pores of diameter from about 50 to about 110 angstroms.

12. The catalyst defined in claim 7 further comprising at least about 5 percent of the total surface area of said support in pores of diameter in each of the 10 angstrom interval ranges of at least 50 but less than 60, at least 60 but less than 70, at least 70 but less than 80, at least 80 but less than 90, at least 90 but less than 100 and at least 100 but less than 110 angstroms.

13. The catalyst defined in claim 7 wherein said porous refractory oxide support consists essentially of gamma alumina.

14. The catalyst defined in claim 7 wherein said catalyst consists essentially of about 17 to about 25 weight percent of at least one molydenum component, about 1 to about 4 weight percent of at least one cobalt component and about 1 to about 4 weight percent of said phosphorus components.

15. A method for preparing a catalyst comprising a porous refractory oxide support, said method comprises compounding at least one Group VIB metal components, at least one Group VIII metal component and about 1 to about 6 weight percent of a phosphorus component, calculated as P, said support comprising a narrow pore size distribution including at least about 70 percent of the total pore volume in pores of diameter from about 60 to about 100 angstroms.

16. The method defined in claim 15 wherein said support has a mode pore diameter in the range from about 70 to about 90 angstroms.

17. The method defined in claim 16 wherein said support has at least about 40 percent of said total pore volume in pores of diameter between the mode pore diameter and less than about 40 angstroms above said mode pore diameter.

18. The method defined in claim 15 wherein said compounding comprises impregnating said support with a stable aqueous impregnant solution consisting essentially of at least about 17 weight percent of a dissolved molybdenum component, calculated as $MoO_3$, and at least about 0.5 to about 10 weight percent of a dissolved cobalt component, calculated as CoO.

19. The method defined in claim 15 wherein said compounding comprises impregnating said support with a stable aqueous impregnant solution comprising molybdenum trioxide, cobalt carbonate and phosphoric acid.

20. The method as defined in claim 16 wherein said support has at least about 30 percent of the total pore volume in pores of diameter between the mode pore diameter and between the mode pore diameter and less than about 20 angstroms above said mode pore diameter.

21. A catalyst comprising at least one group VIB metal component, at least on Group VIII metal component, and about 1 to about 6 weight percent of a phosphorus component, calculated as P, on a porous refractory oxide support, said catalyst has a narrow pore size distribution including at least about 75 percent of the total pore volume in pores of diameter form about 70 to about 130 angstroms, and less than about 0.05 cc/gram of the total pore volume in pores of diameter greater than 130 angstroms, having a mode pore diameter in the range from about 75 to about 115 angstroms, and at least about 40 percent of the total pore volume in pores of diameter less than about 90 angstroms above the mode pore diameter.

22. The catalyst defined in claim 21 wherein at least about 0.3 cc/gram of said total pore volume is in pores of diameter from about 70 to about 130 angstroms.

23. The catalyst defined in claim 21 wherein at least about 8 percent of the total surface area is in pores of diameter in each of the 10 angstrom interval ranges of at least 70 but less than 80, at least 80 but less than 90, at least 90 but less than 100, at least 100 but less than 110, at least 110 but less than 120 and at least 120 but less than 130 angstroms.

24. The catalyst defined in claim 21 wherein at least about 80 percent of said total pore volume is in pores of diameter between about 25 angstroms above or below the mode pore diameter.

25. The catalyst defined in claim 21 further comprising at least about 75 percent of the total surface area in pores of diameter from about 70 to about 130 angstroms.

26. A hydrocarbon conversion catalyst comprising a Group VIB metal component, a Group VIII metal component and about 1 to about 6 weight percent of a phosphorus component, calculated as P, on a porous refractory oxide support, said catalyst having at least about 75 percent of the total pore volume in pores of diameter from about 70 to about 130 angstroms and less than about 10 percent of the total pore volume in pores of diameter greater than about 130 angstroms.

27. The catalyst defined in claim 26 wherein less than about 0.05 cc/gram of said total pore volume is in pores of diameter greater than 130 angstroms.

28. The catalyst defined in claim 26 having a mode pore diameter from about 75 to about 115 angstroms and at least about 40 percent of the total pore volume in pores of diameter between the mode pore diameter and less than about 90 angstroms above the mode pore diameter.

29. The catalyst defined in claim 26 wherein at least about 0.3 cc/gram of said total pore volume is in pores of diameter from about 70 to about 130 angstroms.

30. The catalyst defined in claim 26 consisting essentially of a cobalt or nickel component, a molybdenum component and a phosphorus component on said porous refractory oxide supoprt compriisng gamma alumina.

31. The catalyst defined in claim 26 having at least 8 percent of the total surface area in pores of diameter in each of the 10 angstroms interval ranges of at leat 70 but less than 80, at least 80 but less than 90, at least 90 but less than 100, at least 100 but less than 110, at least 110 but less than 120 and at least 120 but less than 130 angstroms.

32. A hydrodesulfurization catalyst consisting essentially of at least one molybdenum or tungsten component, at least one cobalt or nickel component and about 1 to about 6 weight percent of a phosphorus component, calculated as P, on a porous refractory oxide support containing alumina, said catalyst has a narrow pore size distribution including at least about 75 percent and at least 0.3 cc/gram of the total pore volume in pores of diameter from about 70 to about 130 angstroms and less than about 0.005 cc/gram of the total pore volume in pores of diameter greater than 130 angstroms.

33. The catalyst defined in claim 32 having a mode pore diameter from about 80 to about 110 angstroms and at least 40 percent of the total pore volume in pores of diameter between the mode pore diameter and less than about 50 angstroms above the mode pore diameter.

34. The catalyst defined in claim 32 wherein at least about 0.35 cc/gram of said total pore volume is in pores of diameter from about 70 to about 130 angstroms.

35. The catalyst defined in claim 32 comprising between about 17 and about 35 weight percent of a molybdenum component, calculated as $MoO_2$.

36. The catalyst defined in claim 32 wherein said total pore volume is from about 0.3 to about 0.6 cc/gram.

37. The catalyst defined in claim 32 comprising a surface area between about 100 and 250 $m^2$/gram.

38. The catalyst defined in claim 32 wherein at least about 80 percent of said total pore volume is in pores of diameter in the range between about 25 angstroms above or below the mode pore diameter.

39. A desulfurization catalyst comprising about 17 to about 25 weight percent of a molybdenum component, calculated as $MoO_3$, about 1 to about 6 weight percent of a cobalt component, calculated as CoO, and about 1 to about 6 weight percent of a phosphorus component, calculated as P, on a porous refractory oxide consisting essentially of gamma alumina, said catalyst has a narrow pore size distribution including at least about 75 percent and at least about 0.3 cc/gram of the total pore volume in pores of diameter from about 70 to about 130 angstroms, less than about 0.05 cc/gram of the total pore volume in pores of diameter greater than 130 angstroms, a mode pore diameter from about 80 to about 110 angstroms, and at least about 40 percent of the total pore volume in pores of diameter between the mode pore diameter and less than about 25 angstroms above the mode pore diameter.

40. The catalyst defined in claim 39 wherein said total pore volume is about 0.35 to about 0.50 cc/gram.

41. The catalyst defined in claim 39 having a surface area between about 125 and 225 $m^2$/gram.

42. The catalyst defined in claim 39 having at least 60 percent of said total surface area in pores of diameter from about 75 to about 125 angstroms.

43. The catalyst defined in claim 39 comprising at least about 40 percent of said total pore volume in pores of diameter between the mode pore diameter and less than about 25 angstroms below the mode pore diameter.

44. The catalyst defined in claim 39 wherein said catalyst comprises about 1 to about 4 weight percent of said cobalt component and about 1 to about 4 weight percent of said phosphorus component.

45. The catalyst defined in claim 30 wherein said catalyst comprises about 17 to about 25 weight percent of saidmolybdenum component, about 1 to about 4 weight percent of said cobalt component and about 1 to about 4 weight percent of said phosphorus component.

46. The catalyst defined in claim 32 comprising about 17 to about 25 weight percent of said molybdenum component, about 1 to about 4 weight percent of said cobalt or said nickel component, and about 1 to about 4 weight percent of said phosphorus component.

47. The catalyst defined in claim 22 wherein said Group VIB metal component comprises about 17 to about 25 weight percent of molybdenum components, said Group VIII metal component comprises about 1 to about 4 weight percent of nickel or cobalt components, and said catalyst comprises about 1 to about 4 weight percent of said phosphorus components.

* * * * *

UNITED STATES PATENT AND TRADEMARK OFFICE
CERTIFICATE OF CORRECTION

PATENT NO. : 4,818,743
DATED : April 4, 1989
INVENTOR(S) : Howard D. Simpson

It is certified that error appears in the above-identified patent and that said Letters Patent is hereby corrected as shown below:

Claim 1, column 15, line 13, "phosphurs" should be -- phosphorus --; line 14, "supported" should be -- support --.

Claim 3, column 15, line 40 "molbdenum" should be -- molybdenum --.

Claim 4, column 15, line 44, "6" should be -- 1 --.

Claim 6, column 15, line 53, after the word "volume" insert -- between --.

Claim 14, column 16, line 27, "molydenum" should be -- molybdenum --.

Claim 20, column 16, line 60, delete "as".

Claim 21, column 16, line 67, "on" should be -- one --; column 17, line 4, "form" should be -- from --.

Claim 30, column 17, line 51, "supoprt" should be -- support --.

Claim 32, column 18, line 1, "0.005" should be -- 0.05 --.

Claim 35, column 18, line 13, "MoO$_2$" should be -- MoO$_3$ --.

Claim 45, column 18, line 54, "saidmolybdenum" should be -- said molybdenum --.

UNITED STATES PATENT AND TRADEMARK OFFICE
CERTIFICATE OF CORRECTION

PATENT NO. : 4,818,743

DATED : April 4, 1989

INVENTOR(S) : Howard D. Simpson

It is certified that error appears in the above-indentified patent and that said Letters Patent is hereby corrected as shown below:

Claim 45, column 18, line 54, "saidmolybdenum" should be --said molybdenum--.

Signed and Sealed this

Twenty-first Day of September, 1993

Attest:

Attesting Officer

BRUCE LEHMAN

Commissioner of Patents and Trademarks